United States Patent [19]

Yanagisawa

[11] Patent Number: 5,776,577
[45] Date of Patent: Jul. 7, 1998

[54] MAGNETIC RECORDING DISK HAVING A LUBICANT RESERVOIR ON THE INNER CIRCUMFERENTIAL SURFACE

[75] Inventor: Masahiro Yanagisawa, Tokyo, Japan

[73] Assignee: NEC Corporation, Tokyo, Japan

[21] Appl. No.: 281,435

[22] Filed: Jul. 27, 1994

[30] Foreign Application Priority Data

Jul. 29, 1993 [JP] Japan .................... 5-205572

[51] Int. Cl.⁶ .................... G11B 05/82
[52] U.S. Cl. .................... 428/65.4; 428/192; 428/213; 428/408; 428/422; 428/457; 428/694 TP; 428/694 TC; 428/694 TF; 428/900; 360/135
[58] Field of Search .................... 252/51, 58, 51.5 R, 252/51.5 A; 428/694 T, 694 TP, 694 TC, 694 TF, 694 TS, 64, 65, 66, 192, 194, 64.2, 65.3, 65.4, 65.5, 65.8, 66.6, 66.7; 427/131; 360/135

[56] References Cited

U.S. PATENT DOCUMENTS

| 4,581,270 | 4/1986 | Kato et al. ............... 428/65.4 |
| 4,840,843 | 6/1989 | Sano et al. ............... 428/336 |
| 5,000,864 | 3/1991 | Strepparola et al. ....... 252/51.5 A |
| 5,080,971 | 1/1992 | Yokoyama et al. .......... 428/336 |
| 5,113,302 | 5/1992 | Shimizu et al. ........... 360/135 |
| 5,157,066 | 10/1992 | Shoj et al. .............. 524/220 |
| 5,331,487 | 7/1994 | Gregory et al. ........... 360/97.02 |
| 5,520,981 | 5/1996 | Yang et al. .............. 428/65.5 |

FOREIGN PATENT DOCUMENTS

| 61-133029 | 6/1986 | Japan . |
| 63-217583 | 9/1988 | Japan . |
| 63-225917 | 9/1988 | Japan . |
| 63-225918 | 9/1988 | Japan . |
| 63-237216 | 10/1988 | Japan . |
| 63-258992 | 10/1988 | Japan . |
| 63-258993 | 10/1988 | Japan . |
| 1-184723 | 7/1989 | Japan . |
| 2-73514 | 3/1990 | Japan . |
| 2-81320 | 3/1990 | Japan . |
| 2-81321 | 3/1990 | Japan . |

*Primary Examiner*—Stevan A. Resan
*Attorney, Agent, or Firm*—Laff, Whitesel Conte & Saret, Ltd.

[57] ABSTRACT

In a magnetic recording apparatus, a magnetic recording medium has a disk body and a lubricant covering not only the opposite major surfaces but also the inner circumferential edge of the disk body. The medium prevents the lubricant from flying about despite the spinning thereof and, therefore, remains mechanically durable over a long period of time.

5 Claims, 1 Drawing Sheet

MAGNETIC RECORDING DISK HAVING A LUBICANT RESERVOIR ON THE INNER CIRCUMFERENTIAL SURFACE

BACKGROUND OF THE INVENTION

The present invention relates to a magnetic recording medium for use in a magnetic disk drive, magnetic drum drive or similar magnetic recording apparatus.

A magnetic recording apparatus having a magnetic head and a magnetic recording medium may write and read data out of the medium with a conventional contact start/stop (CSS) scheme. In the CSS scheme, at the beginning of operation, the head and the surface of the medium are held in contact with each other. As the medium is caused to spin at a predetermined speed, an air layer or cap is formed between the head and the medium. In this condition, the head writes or reads data in or out of the medium. As soon as the medium stops spinning at the end of operation, the head and medium are again brought into contact. When the head and medium are in contact, friction acting therebetween causes them to wear and, in the worst case, forms scratches on them. Moreover, even the slightest change in the position of the head makes the load distribution on the head uneven, again scratching the head and medium. It has been customary to apply a lubricant to the surfaces of the medium in order to eliminate the wear attributable to the contact and slide of the medium on the head.

However, the problem with the lubricant, which is usually implemented as liquid oil, is that it flies about while the medium spins. When the lubricant flies about until the thickness thereof decreases below one which preserves mechanical durability, the wear of the medium is accelerated, resulting in the loss of data.

Various approaches have been proposed to prevent the lubricant from being scattered around. For example, Japanese Patent Laid-Open Publication Nos. 2-81321, 2-73514, 63-258993, 63-258992 and 63-237216 propose to cover the medium with a lubricant having a functional group which coupled with a protective film. Japanese Patent Laid-Open Publication Nos. 63-225918 and 63-225917 contemplate to couple a lubricant to a protective film by use of a silane coupling agent. Further, Japanese Patent Laid-Open Publication Nos. 61-133029 teaches heating a lubricant in a vacuum atmosphere in order to cause it to adhere firmly to a protective film. For the same purpose, Japanese Patent Laid-Open Publication No. 1-184723 applies a lubricant after vapor rinsing. However, although a lubricant strongly bonded to a protective layer in a nearly solid state is prevented from flying about, wear resistivity is degraded since the self-repairing function of liquid molecules is lost.

Japanese Patent Laid-Open Publication No. 63-217583 provides a magnetic disk with notches inboard of the innermost portion of a data zone and infiltrates them with a lubricant. The lubricant infiltrated into the notches makes up for the decrease of a lubricant due to the scattering. The problem with this kind of approach is that the lubricant once infiltrated into the notches remains stable, i.e., sparingly oozes out unless a pressure is applied thereto. With such a scheme, it is difficult to prevent the lubricant from flying about since a pressure due to the movement of a slider does not act and since even a centrifugal force is banked by the notches and cannot cause the lubricant to ooze out.

In addition, Japanese Patent Laid-Open Publication No. 2-81320 proposes a structure wherein portions of a magnetic disk contacting a spacer, or jig which will be described, are not covered with a lubricant in order to prevent liquid drops from flying about. This, however, brings about a problem that the mechanical durability of the disk is short due to the absence of a lubricant source.

SUMMARY OF THE INVENTION

It is, therefore, an object of the present invention to provide a magnetic recording medium for a magnetic recording apparatus which prevents a lubricant from flying about despite the spinning thereof and, therefore, achieves improved mechanical durability.

A magnetic recording medium of the present invention comprises a disk body made up of a base, a magnetic medium formed on the base, and a protective film formed on the magnetic medium, and a lubricant covering the surfaces of the disk body including the inner circumferential edge of the disk body.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
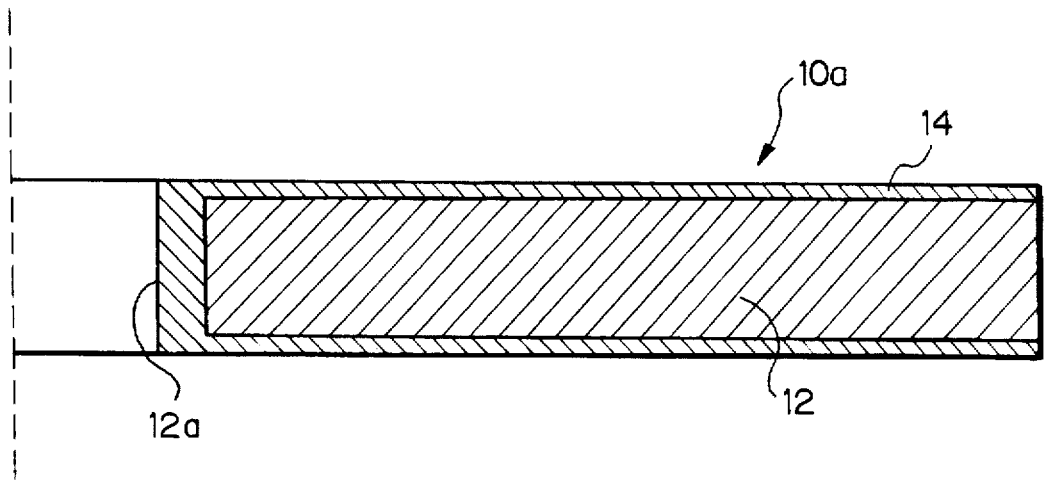
FIG. 1 is a section showing the basic structure of a magnetic recording medium embodying the present invention.
Figure 2:
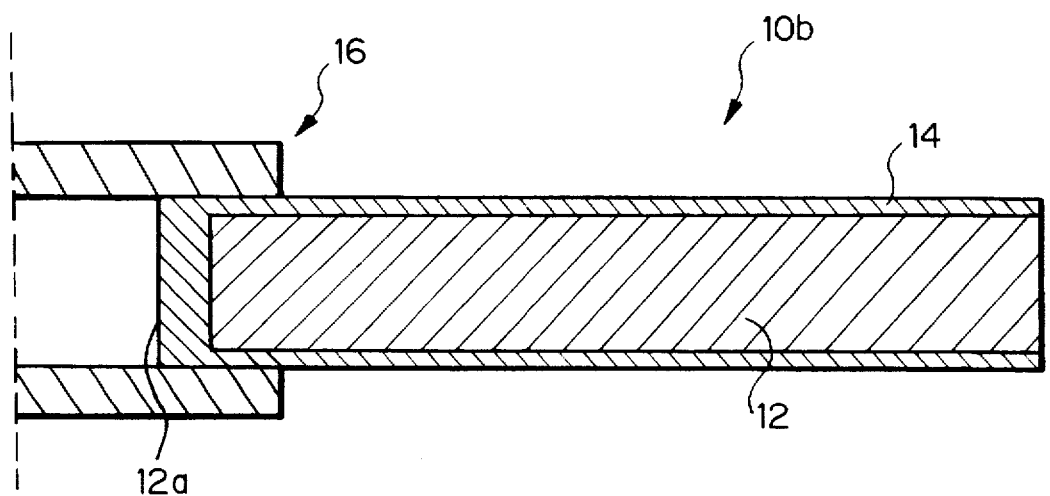
FIG. 2 is a section showing the medium of FIG. 1 which is clamped by a jig.

Referring to FIG. 1 of the drawings, a magnetic recording medium embodying the present invention is shown. As shown, the medium implemented as a disk, generally 10a, has a disk body 12 and a lubricant 14 covering the disk body 12. The lubricant 14 covers not only opposite major surfaces of the medium body 12 but also the inner circumferential edge 12a of the same. As shown in FIG. 2, when the disk 10b is clamped by a jig 16, the lubricant 14 should preferably exist between the disk body 12 and the jig 16 also.

The kind of the lubricant 14 is open to choice so long as it remains in a liquid state over the expected temperature range for use. For example, use may be made of perfluoropolyethers represented by the following general formulae:

$$GCF_2(OCF_2)_p(OC_2F_4)_qOCF_2G \quad (1)$$

(where p and q are integers ranging from 2 to 25, and G is representative of a functional group, e.g., —COOH or —OH)

$$F(C_3F_6O)_nC_2F_4G \quad (2)$$

(where n is an integer ranging from 3 to 25, and G is representative of a functional group, e.g., —COOH or —OH)

$$F(CF(CF_3)CF_2O)_mCF_2G \quad (3)$$

(where in is an integer ranging from 3 to 25, and G i s representative of a functional group, e.g., —COOH or —OH).

A specific example of the above magnetic disk 10a or 10b is as follows. A base was produced by covering an aluminum alloy substrate with a nickel-phosphor plating and then mirror-finishing it. A 30 nanometers thick cobalt-chromium-platinum layer was formed on the base by sputtering as a magnetic medium. A protective layer in the form of an amorphous carbon film was formed on the magnetic medium to a thickness of 20 nanometers, thereby completing the disk body 12. The disk body 12 was immersed in a Freon solution of perfluoropolyether having a hydroxyl group ($HOCF_2(OCF_2)_{13}(OC_2F_4)_8OCF_2OH$), which served as the lubricant 14, and then dried. The resulting lubricant layer 14 was 3 nanometers thick. Subsequently, the undiluted solution of the perfluoropolyether was applied to the inner circumferential edge 12a of the disk body 12 by an applicator to a thickness of 1 micron. As a result, a magnetic disk 10a having the structure shown in FIG. 1 was produced.

For comparison, a magnetic disk 10b was produced by forming a 2 nanometers thick lubricant layer on a disk body, as in the example described above, but not covering the inner circumferential edge and the portions contacting the jig 16.

For an accelerated aging test, the disk 10a and the comparative disk 10b were each rotated at a speed of 10,000 rpm in an 80° C. atmosphere so as to measure the variation of the thickness of the lubricant layer 14. On the elapse of 720 hours, the ratio of the difference between the initial thickness and the thickness after the test to the initial thickness, i.e., reduction ratio was found to be only 1% with the disk 10a having the inner edge 12a thereof covered, but it was measured to be as great as 50% with the disk 10b whose inner edge 12a and portions contacting the jig 16 were not covered.

Further, after the disk 10a and 10b have undergone the accelerated aging test and a magnetic head was repeatedly caused to slide on each other. A scratch appeared on the comparative disk 10b after 5,000 times of sliding. By contrast, the disk 10a of the embodiment was free from scratches even after 20,000 times of sliding.

In the illustrative embodiment, the lubricant 14 covering the inner edge 12a of the medium body 12 plays two different roles at the same time, as follows. The lubricant 14, of course, serves as a lubricant source. In addition, the lubricant 14 links, due to the surface tension thereof, the lubricant 14 covering the opposite major surfaces of the disk body 12, thereby preventing it from flying about. The surface tension acts even on the lubricant intervening between the jig 16 and the disk body 12; the lubricant 14 at the inner edge 12a serves to obviate scattering with the surface tension thereof, rather than to effect lubricant supply.

In summary, it will be seen that the present invention provides a magnetic recording medium which prevents a lubricant from flying about despite the spinning thereof and, therefore, remains mechanically durable over a long period of time.

Various modifications will become possible for those skilled in the art after receiving the teachings of the present disclosure without departing from the scope thereof.

What is claimed is:

1. A magnetic recording medium comprising:

A disk body comprising a base, said disk body having an inner circumferential surface, a metal thin film magnetic layer formed on a major surface of said base, and a protective film formed on said metal thin film magnetic layer; and a liquid lubricant layer covering the opposite major surface of said disk body as well as covering both said protective film and said inner circumferential surface of said disk body, said liquid lubricant layer being substantially thicker on said inner circumferential surface of the disk than on other surface areas of said disk, wherein said liquid lubricant layer on the inner circumferential surface has surface tension which links lubricant covering said opposite major surface with the lubricant covering the protecting film and said lubricant layer-on said inner circumferential surfaces serves as a lubrication reservoir for the remaining surfaces of said disk.

2. A medium as claimed in claim 1, wherein said base comprises an aluminum alloy substrate and a nickel-phosphor plating formed on said aluminum alloy substrate, said metal thin film magnetic layer comprises a cobalt-chromium-platinum alloy sputtered onto said nickel-phosphor plating, and said protective film comprises an amorphous carbon film sputtered onto said metal thin film magnetic medium.

3. A medium as claimed in claim 1, wherein said lubricant comprises $GCF_2(OCF_2)_p(OC_2F_4)_qOCF_2G$ where where p and q are integers ranging from 2 to 25, and G is representative of a functional group.

4. A medium as claimed in claim 1, wherein said lubricant comprises $F(C_3F_6O)_nC_2F_4G$ where n is an integer ranging from 3 to 25, and G is representative of a functional group.

5. A medium as claimed in claim 1, wherein said lubricant comprises $F(CF(CF_3)CF_2O)_mCF_2G$ where m is an integer ranging from 3 to 25, and G is representative of a functional group.

* * * * *

UNITED STATES PATENT AND TRADEMARK OFFICE
CERTIFICATE OF CORRECTION

PATENT NO. : 5,776,577
DATED : July 7, 1998
INVENTOR(S) : Masahiro Yanagisawa

It is certified that error appears in the above-indentified patent and that said Letters Patent is hereby corrected as shown below:

On the title page, item [54] and in column 1, line 2 delete "LUBICANT" and insert --LUBRICANT--.

Signed and Sealed this

Twentieth Day of October, 1998

*Attest:*

BRUCE LEHMAN

*Attesting Officer*     *Commissioner of Patents and Trademarks*